(Model.)

C. B. WITHINGTON.
GRAIN BINDER.

No. 378,225.            Patented Feb. 21, 1888.

WITNESSES
Wm A. Skinkle
Edwin A. Newman

INVENTOR
Charles B. Withington
By his Attorneys,
Pancierson & Pancierson (Model.) 8 Sheets—Sheet 3.
C. B. WITHINGTON.
GRAIN BINDER.

No. 378,225. Patented Feb. 21, 1888.

WITNESSES
Wm A. Skinkle
Edwin A. Newman

INVENTOR
Charles B. Withington
By his Attorneys.
Parkinson & Parkinson

(Model.)

C. B. WITHINGTON.
GRAIN BINDER.

No. 378,225.   Patented Feb. 21, 1888.

WITNESSES
Wm A. Skinkle
Edwin A. Newman.

INVENTOR
Charles B. Withington.
By his Attorneys
Parkinson & Parkinson (Model.) 8 Sheets—Sheet 6.
C. B. WITHINGTON.
GRAIN BINDER.

No. 378,225. Patented Feb. 21, 1888.

WITNESSES
Wm. A. Skinkle
Edwin A. Newman

INVENTOR
Charles B. Withington
By his Attorneys
Parkinson & Parkinson

(Model.)

C. B. WITHINGTON.
GRAIN BINDER.

No. 378,225. Patented Feb. 21, 1888.

WITNESSES
Wm A. Skinkle
Edwin A. Newman.

INVENTOR
Charles B. Withington
By his Attorneys
Parkinson & Parkinson (Model.)

C. B. WITHINGTON.
GRAIN BINDER.

No. 378,225. Patented Feb. 21, 1888.

Witnesses
Wm A Skinkle
Arthur Johnson.

Inventor
Charles B. Withington
By his Attorneys
Parkinson & Parkinson

UNITED STATES PATENT OFFICE.

CHARLES B. WITHINGTON, OF JANESVILLE, WISCONSIN.

GRAIN-BINDER.

SPECIFICATION forming part of Letters Patent No. 378,225, dated February 21, 1888.

Application filed March 15, 1883. Serial No. 88,304. (Model.)

*To all whom it may concern:*

Be it known that I, CHARLES B. WITHINGTON, of Janesville, in the county of Rock and State of Wisconsin, have invented certain new and useful Improvements in Grain-Binders, of which the following is a specification.

Harvesting-machines which automatically bind the grain as they cut and collect it have of late years assumed several distinctive types, all meeting with a fair measure of success in the field. These types may be divided into two classes, the first, in point of time as well as in numbers introduced, being such as have their period of action regular, determined by the gearing, and intermitted only by the agency of the attendant. The second class, which is comparatively modern in its introduction and successful use, embraces those in which the accumulating gavel, by its pressure against a tripping-arm, throws the immediate binder-gearing into connection with the constantly-driven harvester-gearing to cause a single binding operation to take place, after which the band-carrying and band-securing devices assume their original position and are unclutched from the driver until a fresh gavel accumulates and by its pressure again starts the trip. This class is now in growing favor, and perhaps superseding the former.

The well-known reciprocating binder invented by me and for many years manufactured by the McCormick Harvesting Machine Company has heretofore been considered in the first class—that is, the binding-carriage reciprocated at fixed intervals, and, unless intentionally disengaged from its prime motor by the attendant, never had its motion intermitted except for the inappreciable instant at the end of each traverse.

The object of my present invention is, in part, to improve the tripping mechanism of binders generally where tripping devices are employed; in part, to adapt tripping mechanism to said reciprocating binder that its intervals of action may be automatically and variably determined; in part, general improvement upon the structure of such binder, and of band uniting and holding and cutting devices for employment therewith or with other binders of appropriate type; and it consists, as above intimated, in a novel tripping device actuated by the accumulation of the gavel to clutch the binder-gearing with a constantly-driven shaft; in the combination, with a tripping arm or lever and tripping-clutch, of a feed-chain having teeth and arranged in the grain-chute between ledges and upon sprocket-wheels diagonally one above the other, so that its upper length or ply is substantially parallel with the surface of such chute and the teeth project thereabove; in the combination, with the reciprocating binding-carriage, of a trip-lever arranged to receive the pressure of the accumulating gavel at the inner side of the binding-table, a clutching-dog between the inner sprocket-wheel driving the actuating-chain for the binding-carriage and a constantly-driven shaft upon which it is loosely mounted, an arm or stop thrown into position by the trip-lever as it is raised to force said dog into engagement, and a second arm or stop brought momently into position to throw said dog out of engagement by means of a cam or tappet carried by the actuating-chain, and coming into effective play as the binding-carriage reaches the end of its outward traverse; in the combination, with the vibrating binding-arm, of a cord-tucker pivoted thereto, and a stop-motion furnished by the heel of said tucker, and a plate upon the supporting-bracket whereby the tucker will first move with and alongside the binding-arm and then suddenly advance therefrom a sufficient distance to serve its purpose as a tucker and again be held relatively fixed to be carried into its final position by the continued motion of the binding-arm; in a novel knotting device, of a cam-surfaced conoidal shell serving to guide and deflect the cord as it revolves, and jaws pivoted within such shell so as to form a practical continuation thereof when projected, giving it substantially the outline of a tying-bill, and adapted to seize the ends of the cord and withdraw them within said shell by a retracting movement to form the bow of the knot; in the combination of a cam-surfaced conoidal shell revolved by suitable means, a jaw pivoted therein so as to be projected and retracted, a second jaw connected with the first by slots and pins to permit it to slide relatively thereto to open away from or close against it, and a link connected to said second jaw and reciprocated up and down through the shank of the shell at appropriate times to project both jaws and open one away from the other and to close and retract them; in an improved device for furnishing slack from that end of the band-cord in the holder during the knotting action; in an improved holding and cutting device; in an arrangement of cam-grooves, rollers traveling therein, and arms and levers, as hereinafter specified, for operating the knotter, holder, and cutter during the traverse of the binding-carriage; in the combination, with the knotter, of a cord-gate of novel arrangement, and in the various other combinations and details of construction hereinafter described and claimed.

In the drawings, Fig. 29, a front elevation of the knotter, showing the slack-give-up in position for reception of the new strand; Fig. 29$^a$, a similar elevation with the slack-give-up retracted and holding a slack length; Fig. 30, a side elevation, and Fig. 31 a top plan, of the compensating device between the trip lever and the trip-stop to avoid strain; Fig. 32, an enlarged detail, in perspective and partly broken away, of the supporting-block for the knotter and holder, showing the slot for the reception of the cord, the way for the sliding bar or cord-placer, and the seats for the holder-jaws; Figs. 33 and 34, enlarged details in perspective of the yielding holder-jaw; Fig. 35, an enlarged detail, also perspective, of the fixed or stationary holder-jaw; Fig. 36, an enlarged detail view of the knife, and Fig. 37 the sliding bar or cord-placer and the holder-jaws detached from the supporting-block and in their relative positions at one stage of movement of the placer.

A is a portion of the binder-frame, and A' the binder-carriage, reciprocating along suitable ways thereon; A$^2$, the overhung bracket, supporting the rock-shaft by which the vibrating binder-arm is actuated; and A$^3$, the chain, passing over an outer sprocket-wheel, $a$, which is adjustable to tighten said chain, and an inner sprocket-wheel, $a'$, and driving said carriage by means of a slotted crank, locking-dog and stops, and pitman-connection with a crank-arm from the rock-shaft, as in patents heretofore granted to me.

B are the ledges of the grain-chute, through which the point of the binder-arm sweeps in its downward movement to carry the cord around the gavel, and B' a parallel ledge or frame-bar which, in connection with the former, supports near the head of the elevator in appropriate bearings a sprocket or chain wheel, B$^2$, from which a chain, B$^3$, leads downward in the general direction of the chute, with its upper or exposed ply substantially flush with the ledges for a portion of the distance; but toward the foot of the chute these ledges curve outward and away from the chain, so as to act as strippers in clearing the grain from its teeth and to relatively raise the gavel and direct it against the trip-lever.

The chain is composed of short links $b$, with narrow spacing-pieces $b'$, to which said links are riveted in such manner as to bring their ends close together. At suitable distances the spacing-pieces are replaced by teeth or fingers $b^2$, which are also connected to the links by rivets set near together, one rivet for each link. This construction permits a slight knuckling action of the teeth, that they may be readily withdrawn from the grain, while at the same time they are held sufficiently rigid by the tension of the chain to perform their office as feeders. The lower bend or bight of the chain passes around a sprocket-wheel, B$^4$, on a shaft, C, located beneath the table in the angle formed by its junction with the chute, constantly driven from the harvester, and bearing at its front end, loosely mounted, the inner sprocket-wheel of the carriage-chain, whereby motion is to be communicated to said chain. The toothed feed-chain moving continuously will carry the grain delivered over the head of the harvester-elevator with regularity down the chute. Its office is to feed—not, in the regimen of the present machine, to pack; but, if desired, either on account of a change in the structure or by the substitution of a different tripping arrangement, it may be replaced by packers, or may itself carry packing-arms.

In order to cause the loose sprocket-wheel to be clutched to the driving-shaft whenever sufficient grain has accumulated to form a full-sized gavel, thereby starting the binding-carriage and setting its mechanism in action, a disk, C', is pinned to said driving-shaft near to the sprocket-wheel. To this disk is rigidly secured the pivot-pin $c$ of a driving dog, $C^2$, lying between it and the opposing face of the sprocket-wheel. Upon the sprocket-wheel, just within its rim, is a pin bearing advisably an anti-friction roll, $c'$, and from the effective end of the driving-dog projects a lateral finger, $c^2$, which, when the dog is depressed upon its pivot, will come into contact with the roll, and, acting against it as a stop, will cause the sprocket-wheel to partake of the motion of the shaft; but whenever the lateral arm is thrown into an orbit not intersecting the stop on the sprocket the latter will be readily passed by the shank of the dog, owing to its relatively-diminished thickness, and the sprocket-wheel will not be driven. The disk is slotted, as at $c^3$, concentrically with the pivot of the driving-dog and preferably at a point opposite the lateral arm of said dog, and through this slot projects a pin, $c^4$, for some little distance beyond the disk, whereby the dog can be vibrated upon its pivot to an extent limited by the length of the slot, causing it, when at the lower or outer end of said slot, to engage with the stop on the sprocket-wheel, and when at the upper end thereof to be entirely free from interference with said stop. The surface of the latter, being in the form of an anti-friction roll, will facilitate the disengagement of the dog therefrom, even when they are bound together in the act of driving the machine, while the outer extremity of the slot in the disk, preventing motion of the dog beyond the proper limit for effectively engaging with the stop, will hold them in action until intentionally thrown out.

Figure 1:
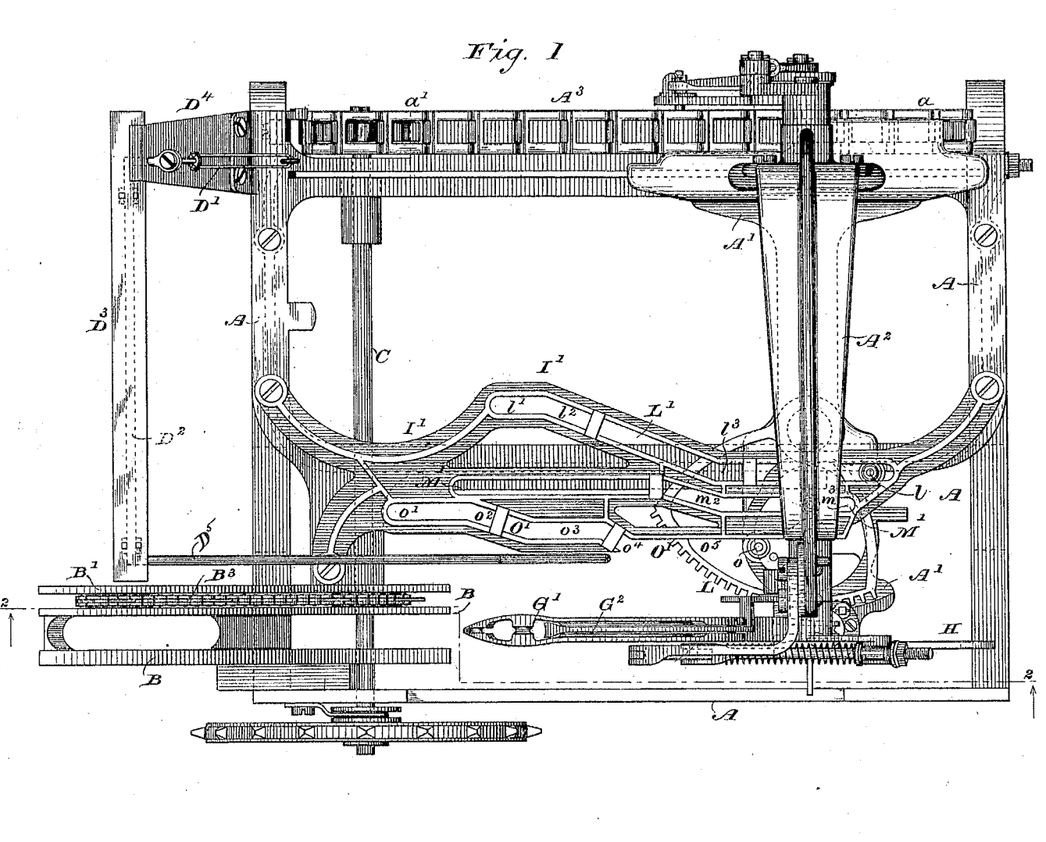
Figure 1 is a top plan view of a reciprocating binder constructed in accordance with my invention, the decking of the binding-table and grain-chute being removed to show the operative parts.
Figure 2:
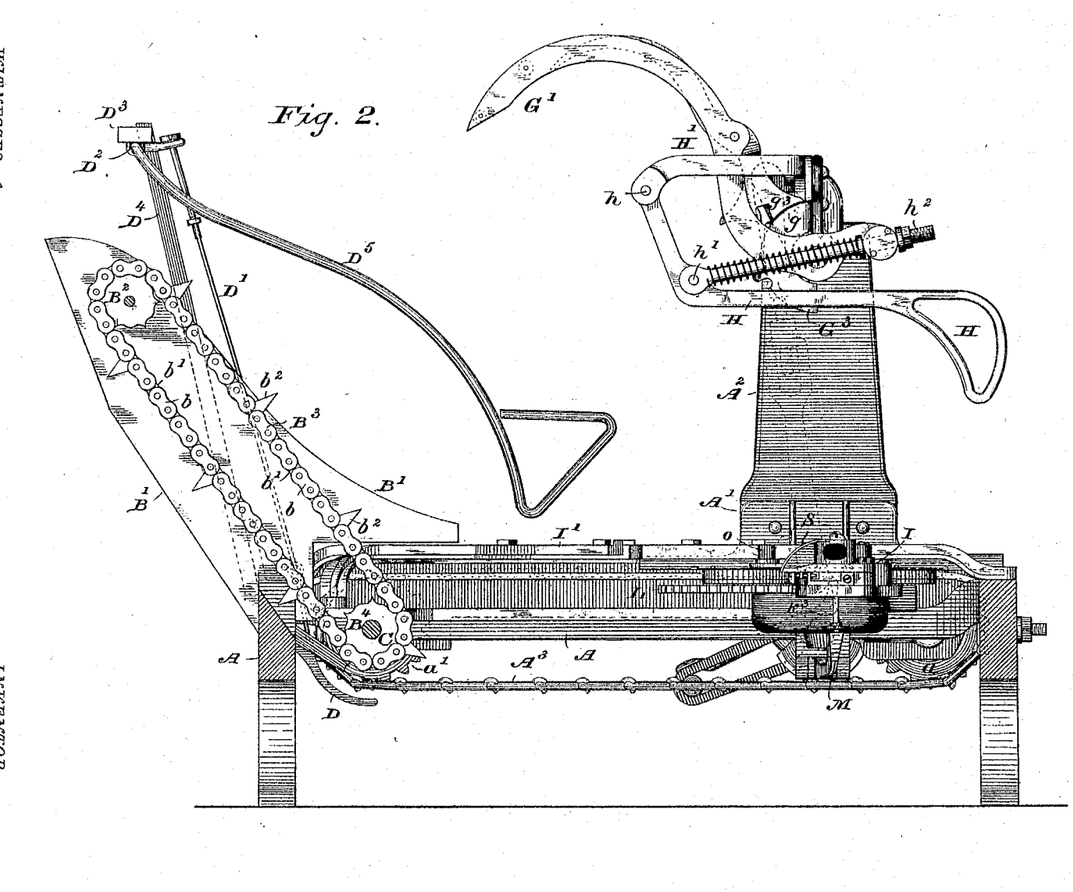
Fig. 2 is an elevation thereof from the rear.
Figure 3:
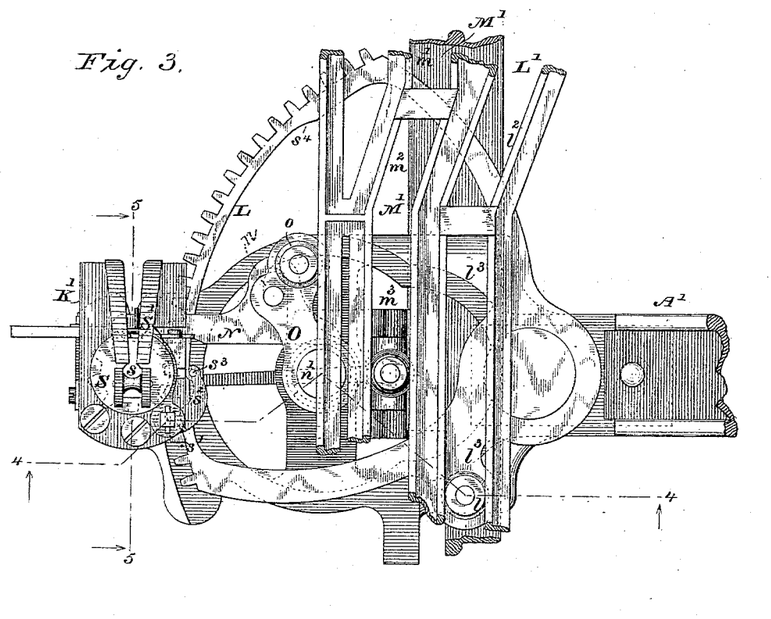
Fig. 3, an enlarged detail in plan of the knotter-case and a portion of the mechanism for operating said knotter and the holding and cutting devices and cord-gate.
Figure 4:
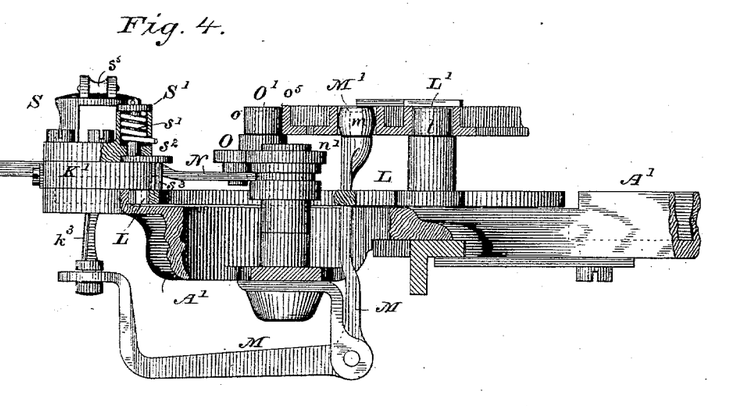
Fig. 4, a vertical section through the parts represented in the preceding and upon the line indicated therein.
Figure 26:
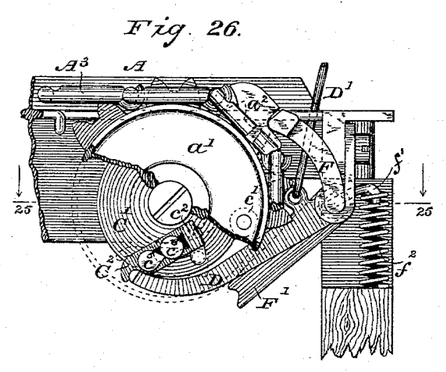
Fig. 26, a side elevation of the same, partly broken away to show the clutching-dog.
Figure 27:
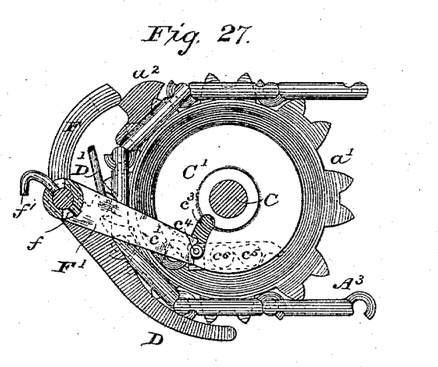
Fig. 27, an opposite side elevation of the same.
Figure 28:
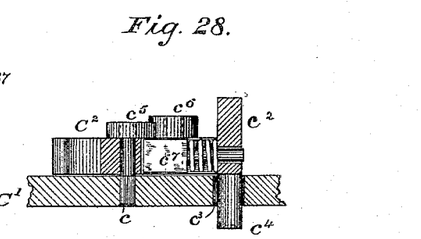
Fig. 28, a detail, partly in section, of the clutching-dog.
Figures 29, 29A, 30, 31:
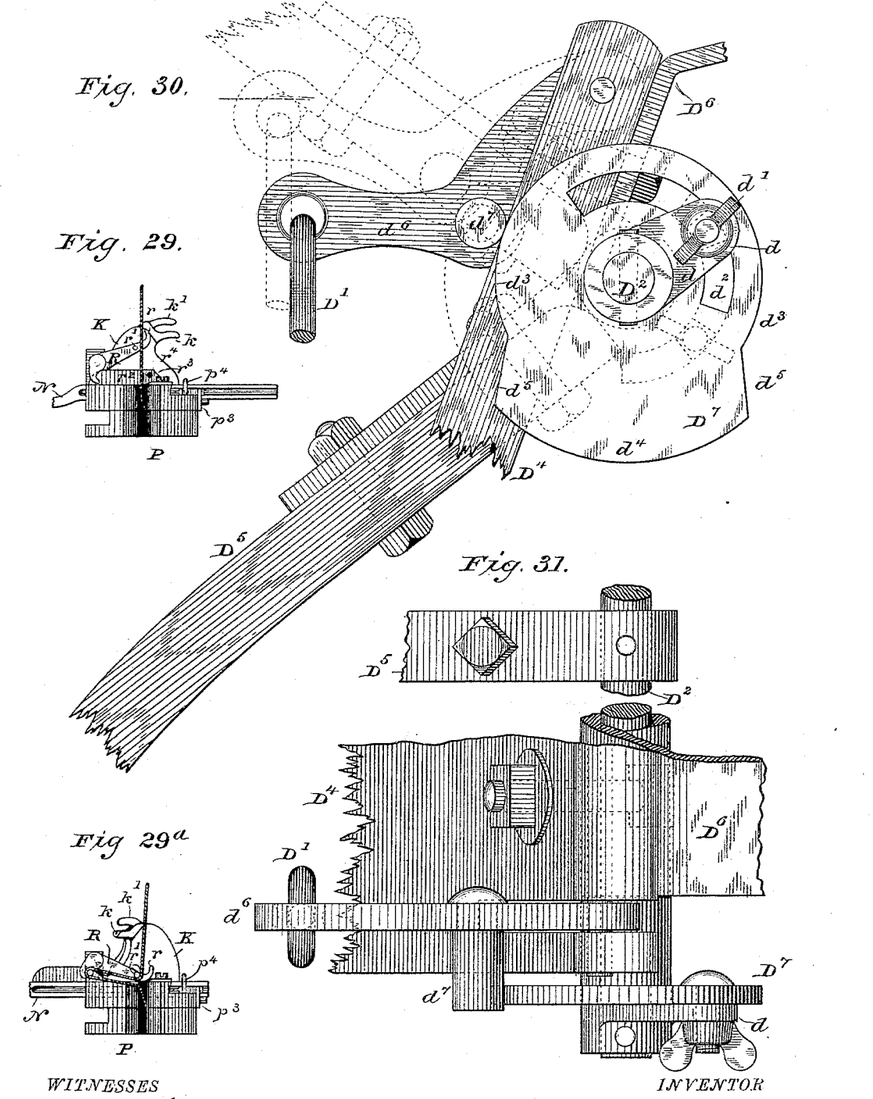

To further insure the dog against accidental disengagement, and also to stay it in position when it has been thrown out of engagement, a spring-lock of some form will be employed, the most effective known to me being that represented in Figs. 26 and 28, consisting, essentially, of a heart-cam, $c^5$, fast to the end of the fixed pivot-pin upon which the locking-dog vibrates, so as to be relatively stationary, and a roller, $c^6$, mounted on a spindle projecting from a block, $c^7$, which slides in a slot or way in the dog and is pressed forward constantly toward the cam by means of a coiled spring encircling its shank. Thus, when the dog is in engagement and driving the sprocket-wheel, the roller will be in contact with one side of the cam and prevented by its projecting point from escape, holding the dog down to the extent permitted by the slot in the disk; but when the dog is forcibly pushed up away from the stop-pin on the sprocket-wheel the roller, yielding with the sliding block by which it is carried against the stress of the spring, will travel over the point of the cam and come upon the other side, so as to hold the dog in its open position and prevent it from accidentally falling again into contact with the stop. The heel of the dog is prolonged, so that when said dog is open or out of engagement this heel will project beyond the periphery of the disk. Upon the frame-work is pivoted an arm, D, in such position that if raised its point will come against said heel of the open dog while the latter is carried about by the rotation of the disk, and, stopping it, will force the dog to rock upon its pivot, carrying the effective end down until it reaches its driving position. For the purpose of insuring more perfect action between this tripping-arm, hereinafter called the "trip-stop," and the heel of the dog, the latter is curved or recessed, as shown, to receive the rounded point of the trip-stop, which, therefore, cannot slip past or escape, but will certainly catch against the dog and operate it, as stated. This trip-stop is connected by means of a link, D', with a short crank from a rock-shaft, $D^2$, carried in bearings upon an arm, $D^3$, overhung from the front post, $D^4$, of the elevator-frame or from any suitable standard, or else said rock-shaft may be supported in a bearing upon this front post at its forward end, and in a second bearing at its rear end strapped to or suspended from the grain guard or deflector. Rigid with said rock-shaft is an arm, $D^5$, extending downwardly above the grain-chute to a termination near to the binding-table to form a trip-lever and suitably curved to permit the gavel to accumulate beneath it. Its position of course is such as to bring it substantially above the waist of the gavel, and therefore close alongside the path traveled by the point of the binder-arm and above or nearly above the feed-chain. Now, supposing grain to be fed down the chute, either by the feed-chain already described or by other suitable means, so as to accumulate gradually beneath the trip-lever, the latter will be progressively raised, rocking the shaft to which it is secured, until the crank-arm on the end of the shaft has, through the connecting-link, raised the trip-stop sufficiently to tip the driving-dog on its pivot, when the driving-shaft will at once be clutched to the inner sprocket-wheel and the binding-carriage set in motion to gather, compress, and encircle the gavel and discharge it from the machine. In one form of this tripping device (shown in Figs. 1 and 2) the link-connection between the trip-stop and the rock-shaft is provided with a turnbuckle, so that it may be lengthened or shortened, the upper end of this turn-buckle passing loosely through the crank from the rock-shaft, so that the trip-lever may not be affected as to its lowest position by an alteration in the length of the link, but may at all times fall to such position to receive the grain as it is fed in. The result is that by shortening the link the trip-lever will act sooner and the gavels bound will be of smaller size, while by lengthening it the size of the gavels will be increased, or a larger amount of grain will accumulate before the binding mechanism is started. However, this construction is open to one objection—that is, that if by any means, such as the clogging of the machine or the forcible withdrawal of an unusually large-sized sheaf past the end of the trip-lever, strain should be brought upon the connections beyond the degree just sufficient for their action they may be sprung or some part give way. I propose, therefore, to insert a compensating device between the trip-lever and the trip-stop, preferably at the point where the connecting-link unites with the rock-shaft. Elastic compensations of a length of coiled spring, while they modify the strain and to this extent are beneficial, do not entirely obviate it. The change which they introduce is comparative only. My desire is to wholly remove strain from the moment the parts have been brought into position for tripping the dog, so that, supposing, for instance, the point of the trip-stop has been brought within a line of the edge of the disk at the moment it effects the engagement of the dog, it will not under any circumstances reduce that distance, although the trip-lever may be given an additional and extraordinary movement. To this end the compensating device must be in a sense positive. Such a device is represented in Figs. 30 and 31 in connection with the rock-shaft and link, other parts being broken away or only limitedly shown, as their arrangement and position are fully indicated in the larger figures of the drawings. In this construction the tripping-lever which sizes the bundles is, as before, placed in the center of the grain-receptacle near the binder-arm, and the rock-shaft, to which it is rigidly affixed, extends forward along the machine to the front supporting brace or standard, $D^4$, which, unless it is one of the elevator-struts, will be rigidly held at its top, say, by the wrought-iron strap $D^6$, connecting it with the head of the elevator or with a portion of the deflector.

The tripping-arm itself is represented as of wood and connected to the rock-shaft by a metal strap. This will probably be the preferable form, although, of course, it is interchangeable with a metal arm whatever the construction of the remaining tripping devices.

To the rock-shaft, at the front of the machine just beyond the standard, or else in any proper relation thereto for its purpose, is rigidly secured the casting $d$ by means of a pin or key. Next to this is a plate-cam, $D^7$, sleeved loosely to the shaft and connected to the casting by means of a clamping thumb-screw, $d'$, taking into a segmental slot, $d^2$, in the plate, so that said plate may be adjusted radially about the shaft for the purpose of changing the time of tripping, and thereby allowing the collection of a greater or less amount of grain to form a gavel, as will presently appear.

The plate-cam has two tracks, both of which are concentric with its axis, but one described upon an arc of greater diameter than the other. The inner track, $d^3$, merges into or connects with the outer or raised track, $d^4$, by means of inclines $d^5$, both tracks being in the same plane. To the front post or standard, above the cam, is pivoted an arm, $d^6$, connected at its outer end to the link $D'$, which, as hereinbefore stated, is attached at the lower end to the trip stop. Between the link and the pivot is a pin or a roller, $d^7$, turning upon a lateral spindle attached to said pivoted arm and resting upon the periphery of the cam. When the binding mechanism is at rest, this roller is in contact with and travels upon the inner track of the cam; but as the cam is turned with the shaft by the gradual raising of the trip-lever the roller will be lifted from the inner to the outer track, passing up the communicating incline $d^5$, and at the moment it reaches said outer track the clutch will be engaged and the binding mechanism started. Any further movement of the trip-lever will simply carry the roller relatively along the outer track without disturbing the position of the arm to which it is attached or in any way moving the link. The trip-stop will therefore remain absolutely stationary as long as the roller is upon this outer track; but when the binding operation is completed or so far progressed as to permit the trip-lever to fall to its normal position, then the reverse movement of the plate-cam will bring the roller back to the inner track, the arm $d^6$ will sink, and the trip-stop will drop out of the way of the locking-dog. Both tracks being concentric with the axis of the cam, it is evident that while the roller is upon the inner track, as well as upon the outer, there will be no movement of the trip-stop or of the connecting-link, whatever the instrumentality may be which is operated by that. The only and the entire movement will take place while the roller is traveling up the incline or passing down it from one track to the other. As the plate-cam is adjustable radially about the rock-shaft, the time at which the roller will strike the incline and move up it can be hastened or delayed, permitting the trip-lever a shorter or a longer sweep before the binding mechanism is started, thus admitting of a smaller or of a larger sheaf, as deemed preferable. This compensating device may be used with a tripping-clutch of different construction from that herein described, and is not to be taken as limited either to the particular arrangement of the trip-lever or to the specific construction of the clutch; nor is it limited to the precise form of the cam, as one with lateral instead of peripheral tracks may be employed, or a cam-groove with lateral jog or incline connecting two straight or concentric tracks, the other mechanism being of course suitably modified or adapted to conform to such substitute.

Right here it is proper to state that I consider it equally within the principle of my invention whether the peculiar driving dog or clutch arrangement described is used in connection with a sprocket-wheel or with a spur gear-wheel, the one being in respect to its function of communicating motion an equivalent of the other. The stop and anti-friction roll may therefore be attached to the face of a gear-wheel driving binding mechanism of different style and arrangement from that herein shown, having, for example, a stationary carriage instead of one which reciprocates.

So far the tripping mechanism described only throws the clutch or driving instrumentality into engagement with its prime motor or driving-shaft and causes, in the particular type in connection with which it is being illustrated, the binding-carriage to move inward, the binding-arm to descend and gather and compress the grain, and the carriage to move outward to the opposite end of its traverse, where the binder-arm and compressor will be opened and the sheaf ejected. At this stage it is intended that the whole binding mechanism shall be thrown out of action and remain at rest until again started by the accumulation of a fresh gavel beneath the trip-lever. To this end the carriage-chain is furnished upon one link with a tappet or wiper, $a^3$, so that once in every complete revolution of the chain, and invariably when the binding-carriage is at the same position in its traverse, said tappet shall pass a given point and operate disengaging mechanism. In the present instance the arrangement is such that the tappet passes to the upper periphery of the inner sprocket-wheel at the very moment at which the binder-carriage has reached the extremity of its outward movement and the binder-arm and compressor have been opened to discharge the bound sheaf.

A pawl, F, is mounted on the end of a short horizontal spindle or shaft carried in boxes on the frame, so as to rest upon the chain as it moves and to be struck and lifted by the tappet as the latter ascends to the upper ply of the chain. To the other end of the shaft is pivoted the disengaging-stop F', which is, by means of flaring apertures f, to receive its fastening-pin f', or else by a shoulder and stop allowed a certain freedom of upward movement independent of the pawl, while its own gravity keeps it always at the limit of its downward movement relatively to said pawl, so that whenever the pawl is raised the stop will follow it; but after the pawl has ceased to move said stop may yet continue to move if the exigencies of the machine require.

The fastening-pin which connects the stop to the spindle is bent at its heel to enter into the upper end of a coiled spring, $f^2$, by which the pawl is constantly urged toward the chain. This spring may, however, be otherwise applied, and it is not necessary that the pin should be an agent in securing it. The disengaging-stop is so arranged that when lifted by the pawl it comes alongside the disk pinned to the driving-shaft, and its notched free end receives the projecting pin from the locking-dog and forces it up along the slot in said disk until the dog is disengaged and locked or latched into such disengaged position, as above explained. The additional independent motion of the disengaging-stop is that it may follow the pin clear to the upper end of the slot. The movement of the pawl itself is only just sufficient to bring the stop up against the pin. The further movement between the two is a sort of toggle movement, caused by the revolution of the disk, which tends to lift the disengaging-stop, and which finally carries the pin, now confined at the inner end of the slot, off of the end of the disengaging-stop and allows the latter to fall to its original position. The binding mechanism having thus been thrown out of action will not again start until the trip-lever has been a second time raised by the predetermined accumulation of grain, bringing the trip-stop afresh against the heel of the driving-dog as it is carried around by the constantly-rotating disk and tripping said dog into position to again strike the driving-pin on the sprocket-wheel and move the latter, when the operation will be repeated. The disengagement of the clutch is completed the instant that the tappet has passed entirely beneath the pawl and the latter drops behind said tappet, which is cut away to form a shoulder, against which the end of the pawl will rest, thus preventing any retrograde motion of the chain or binding-carriage, so that it has a double function—first, in disengaging said clutch, and, second, as a locking device for the carriage.

Should a pinion or gear-wheel be substituted for the sprocket wheel and chain, it is evident that a tappet thereon may be caused to actuate the pawl in the same way and to serve in connection with it to prevent reverse motion. It is necessary, as the driving-dog must be disengaged at the moment the pawl is riding over the tappet, that there should always be such co-relation between the tappet and the dog as to bring the latter against the disengaging-stop at the very instant that the tappet lifts the pawl—that is, as the tappet passes around the sprocket-wheel it must invariably occupy the same relative position to the driving-dog, which, it will be remembered, is at the time engaging with the stop-pin on the wheel. This is accomplished by making the number of links on the chain a multiple of the number of teeth on the sprocket-wheel. Allowing the latter eight teeth, the chain may have thirty-two, so that the sprocket-wheel will make precisely four revolutions before the tappet returns to its starting position. Thus there will be no displacement of the tappet relatively to the stop-pin or dog, for it will always ascend to the upper side of the sprocket-wheel in the last half of the full fourth revolution, and will lift the pawl exactly as that revolution is terminated. With a discrepancy between the sprocket-teeth and the links of the chain, one of the two instrumentalities would always be gaining upon the other, and the pawl would be lifted without disengaging the clutch, except at long intervals.

Passing now to the organization of the actual binding apparatus, the rock-shaft G, supported in the overhung bracket, has pinned to it at its outer or rear end, in the usual position, the binder-arm G', slotted longitudinally to receive the cord-tucker G², pivoted thereto, and in general arrangement resembling tuckers heretofore used on my machines. The relative movement of the tucker in advance of the binding-arm has, however, formerly been obtained by a pin from its heel-extension taking into a cam-slot in the end of the bracket, or else by other analogous arrangement. In the present instance it is obtained by a stop-motion. A disk, G³, is fixed to the end of the bracket and is provided with two delay-surfaces or tracks, $g$ and $g'$, described on an arc concentric with the axis of the binder-arm. Between these tracks is a single projecting tooth, $g^2$, flanked by notches. The heel of the tucker is provided with delay-shoes $g^3$ $g^4$, curved to fit upon the tracks, but individually described from different centers, so that perpendiculars bisecting them will meet at a point in the said heel between the shoes and the pivot. These delay-shoes are separated by a notch or recess, $g^5$, intended to receive the tooth upon the disk. With this construction, if the binder-arm is up, the delay-shoe $g^3$ will sit upon the upper part of the track $g$, holding the tucker closed in between the sides of said arm, and when it is depressed by the movement of the rock-shaft said tucker, as long as the shoe $g^3$ travels upon the track $g$, will continue in the same relative position, moving as one with the arm; but when the tooth $g^2$ is reached this will enter the recess $g^5$ and rock the tucker upon its pivot, carrying it in advance of the binder-arm and bringing the shoe $g^4$ into contact with the track $g'$, the notches on each side of the tooth being for the purpose of receiving the projecting ends of the shoes in this passage from one track to the other. As soon as the second shoe is firmly seated upon its track, the tucker is again and thereby locked to the binder-arm, so as to move with it, but at a fixed distance in advance of it, and will thus continue until the binder-arm rises, when the motion is reversed and the tucker finally locked again into the recess in said arm and held there while it is up.

H is the compressor, pivoted at $h$ to an arm, H', bolted to the overhung bracket and extending laterally therefrom a suitable distance. At $h'$ a bolt is pivoted to the compressor, running therefrom through an eye in the heel of the binder-arm above the rock-shaft, and prevented from escape by an adjustable nut, $h^2$. A coiled spring, $h^3$, encircles the bolt between its point of attachment to the compressor and its entrance into the binder-arm, a washer, $h^4$, being placed at the latter point to afford a good seat for the spring. While the binder-arm is raised, as in Fig. 2, the compressor will be held open, since the heel of the arm will be at its greatest distance from the compressor-pivot, and by means of the bolt will lift said compressor; but when the arm descends its heel, approaching said pivot, will force the compressor down upon the grain as it is encircled with a force determined by the tension of the spring, which will yield to the resistance, allowing the bolt to play through the eye in the arm.

At the end of the binding-carriage beneath the binder-arm is carried a head, I, containing the knotter, the cord holding and cutting devices, and the cord-gate. A casting, I', beneath the decking of the binding-table and immediately over the carriage, is so placed transversely to the table that the carriage as it reciprocates will move along its length. Three cam grooves or tracks are formed in this casting, which give motion by intermediate mechanism to the devices contained in the binding-head, as will presently appear. The casting is, so far as possible, relieved of dead-weight by forming it as a skeleton.

Figure 9:
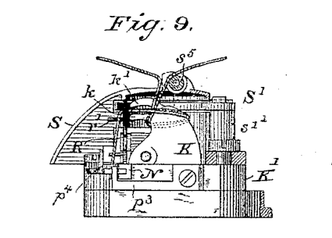
Figure 10:
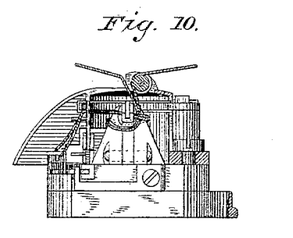
Figure 11:
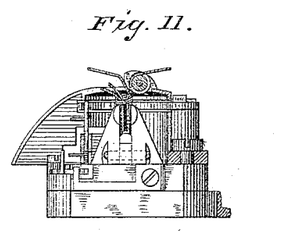
Figure 12:
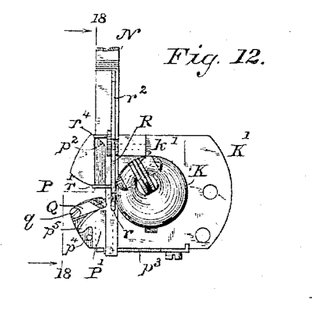
Figs. 12, 13, and 14, top plan views of the knotter, holder, and cutter with the covering-case removed and in successive positions.
Figure 13:
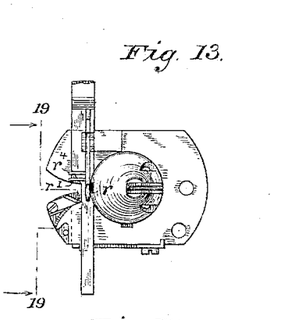
Figure 14:
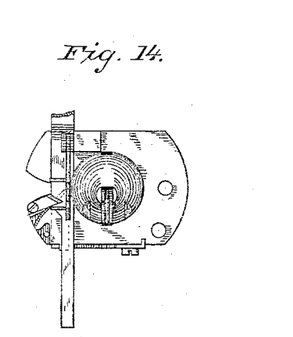
Figure 15:
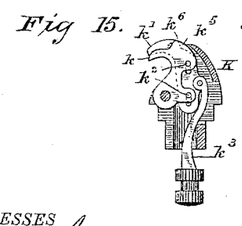
Fig. 15, the knotter detached from its case and supporting-block and in section through the conoidal shell, with the jaws projected and closed, as at the moment when they have seized the ends of the cord and are starting to withdraw them into the shell.
Figure 16:
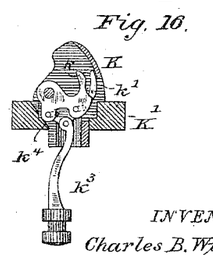
Fig. 16, the same as the foregoing, except that a portion of the supporting-block is shown and the jaws are retracted and open.
Figure 17:
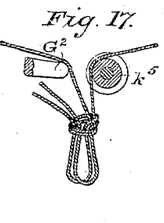
Fig. 17, a diagram illustrating the knot at the moment of its completion.
Figure 18:
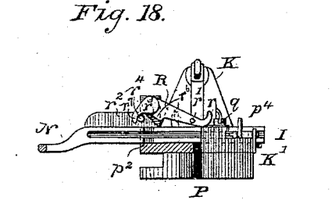
Fig. 18, a front elevation of the knotter, cord holder and cutter, and the slack-give-up, the latter in position to retain the slack length of cord.

The knotter consists of a shell, K, having an effective surface curved and cam-shaped, as represented in Figs. 9 and 16. The hollow shank of this shell is turned cylindrical to form a journal which is received in a seat in the supporting-block K', and beneath this block is a pinion, K², pinned to said shank prolonged or to a reduction thereof, by which pinion the shell is driven. Pivoted within and to the shell, at the front part thereof, is a jaw, $k$, forming the lower jaw of the knotter. A second or upper jaw, $k'$, is attached to the first by slot-and-pin connections $k^2$, so that it may slide longitudinally thereof a slight distance, and to the body or tang of this second jaw is pivoted a rod or link, $k^3$, which passes down through the hollow shank of the shell, and by the reciprocation of which the jaws may either be projected from said shell, giving the form of a complete tying-bill, as in Fig. 15, or withdrawn therein entirely, as in Fig. 16. Whenever they are projected to the full extent, the upper jaw, sliding along the lower one, opens away therefrom, so that the band ends may enter between the two; but when the link moves to retract them it first draws the upper jaw down against the one beneath, closing them to grasp the cord, and then withdraws the two bodily within the shell. At the extreme of the downward movement the tang end of the upper jaw, passing through a slot in the shell or casing, strikes the supporting-block at $k^4$ and is stopped, while, the pivotal movement continuing, the two jaws are forced apart to release the band ends. A shoulder, $k^5$, is formed upon the top of the upper jaw, which, when the latter is fully projected, rises above the surface of the lower and affords a detent to prevent the loop of the cord from slipping off; but when the jaws are about to be retracted the upper one sinks into the lower, which at this point has raised sides $k^6$, so that a flush surface is presented, and the loop will readily pull over the two and tighten upon the ends of the band grasped between them.

The block which carries the knotter is secured upon a suitable seat at the end of the binding-carriage. Seat and block are slotted for the admission of the cord to the knotter, and at the inner end of the slot the seat is bored to receive the pinion beneath said block and cut away to one side of the bore to give a segment-rack, L, pivoted to the carriage, access to said pinion to turn it. At a point eccentric to its pivot the rack has a vertical pin carrying an anti-friction roll, $l$, which takes into the cam-groove L' in the transverse casting, and as it follows said groove swings the rack back and forth to rotate the knotter. Supposing the binding-carriage to be at the extreme of its inward traverse and to be started outward, a short and hardly appreciable portion, $l'$, of the track is straight or parallel with the movement of the carriage. While the roller is in this part the rack will be stationary, but as the carriage moves on the track inclines, as at $l^2$, sufficiently to give the rack a full movement upon its pivot or a movement commensurate with the knotting operation. Then, at the moment that the strands of the band have been laid in position to form the knot and the crossed ends are seized by the jaws of the knotter to form the loop, said knotter is to cease its revolution, and the cam-track will therefore again become straight for the remaining stretch, $l^3$, to prevent the segment from moving.

The link $k^3$, which projects and retracts the knotting-jaws, is connected by means of a groove and collar, which will permit it to revolve freely with the knotter, with one end of an elbow-lever, M, pivoted beneath the carriage. The other end of this lever extends upward through a slot or opening in said carriage until an anti-friction roll, $m$, carried at its extremity, enters into the cam-track M'. Starting from the inner side of the binding-table, this cam-track has a long straight portion, $m'$, parallel with the course of the carriage, which portion corresponds with the distance traveled while the knotter is rotating, such rotation in the present instance being substantially one-quarter over a full revolution; but at the moment it ceases to rotate the track becomes inclined for a short distance, $m^2$, thus swinging the lever on its pivot and causing the link to be retracted, closing the knotting-jaws and drawing them within the shell. Then, when the upper jaw has struck the casing or supporting-block and been opened away from the lower to release the bow of the knot, the track again becomes straight, and remains straight for the remaining portion, $m^3$, to hold link and jaws in their last position without strain.

The block K', which supports and forms a bearing for the knotter, is channeled in front of said knotter to receive and afford a way for the sliding bar N, forming in one of its phases a cord-placer to carry the strand or strands into the holder. This bar has a broad shank with a transverse oblong slot, $n$, which receives a pin from the arm O, swinging on a vertical pivot, $n'$, from the binder-carriage, and bearing upon its upper surface an anti-friction roll, $o$. This roll follows the third cam track or groove, O', which at first is straight for a short distance, $o'$, from the inner side of the table, then has an incline, $o^2$, merging into another straight portion, $o^3$, and serving to cause the initial movement of the bar to yield up slack to the knotter, as presently described; next, a short and very sharp incline, $o^4$, which gives the sliding bar a quick decisive movement to carry the cord into the grip of the holder and to sever it just at the moment when the jaws have seized the ends and are commencing to withdraw into the shell, and, finally, a long straight track, $o^5$, which retains the bar in a stationary position during the remainder of the outward traverse.

Figures 5, 22, 23, 24:
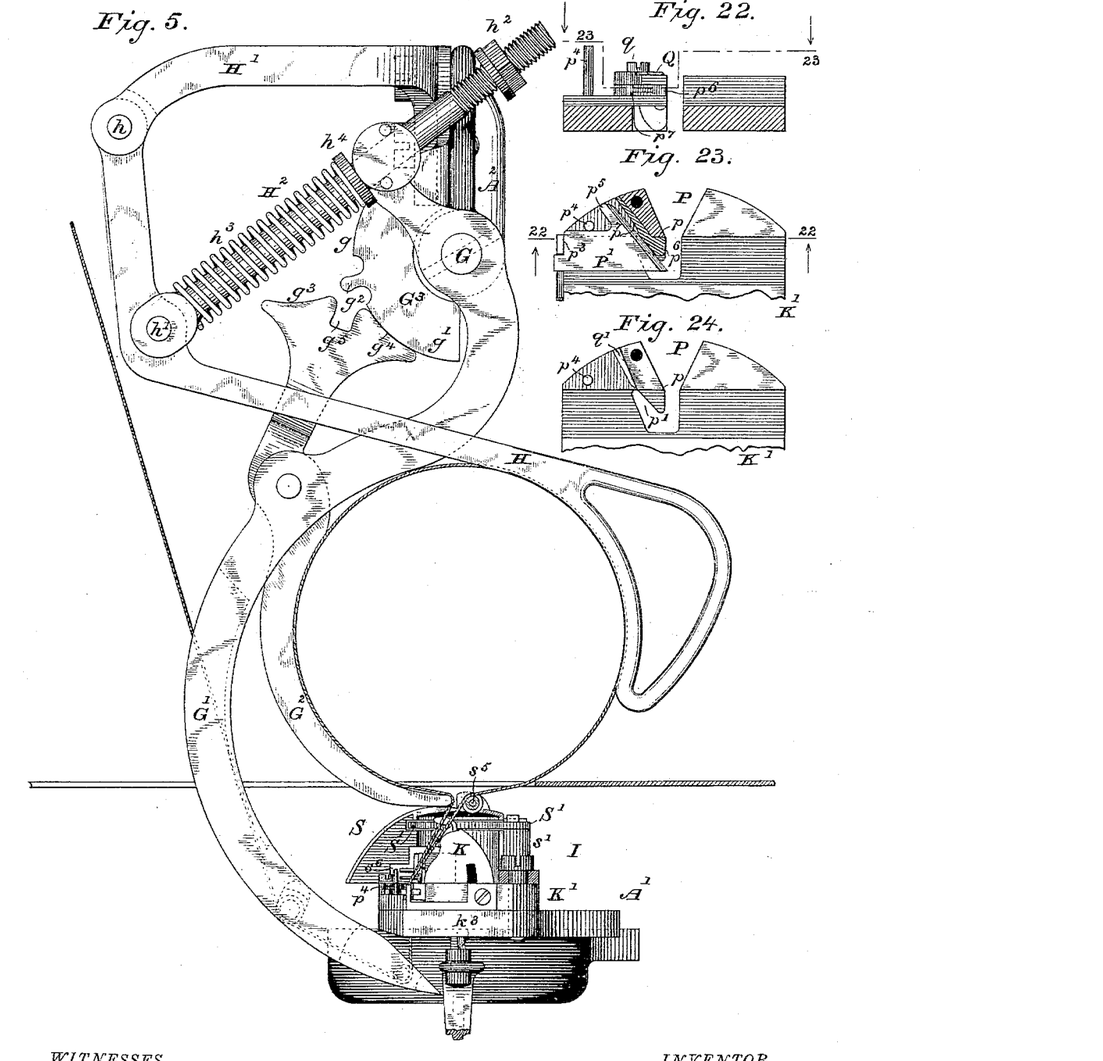
Fig. 5, an enlarged side elevation of the binding-arm, cord-tucker, and compressor, with the knotting-case in section to show the mechanism which it covers.
Figs. 22, 23, and 24, enlarged details of parts of said holder and cutter.
Figure 6:
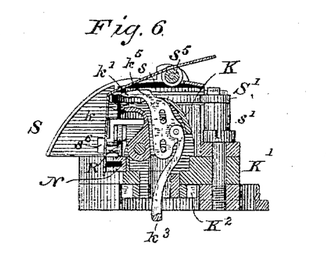
Fig. 6, the knotting-case and knotter detached and in vertical section longitudinally therethrough.
Figure 7:
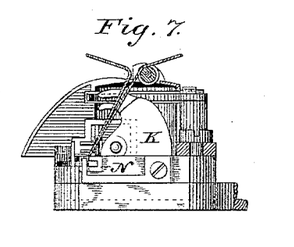
Fig. 7, the knotter in the position from which it takes its initial movement, with the ends of the band stretched past it and ready to be united.
Figure 8:
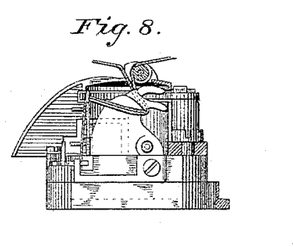
Figs. 8, 9, 10, and 11, the knotter in elevation in successive stages of its action.
Figures 32, 33, 34, 35, 36:
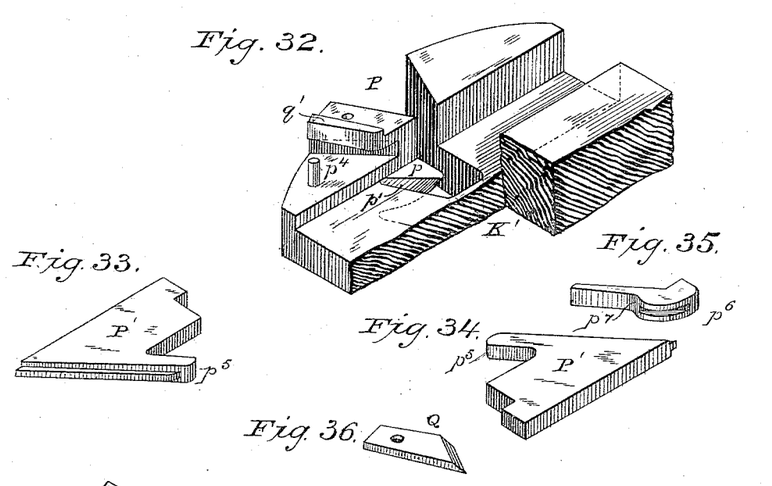
Figure 37:
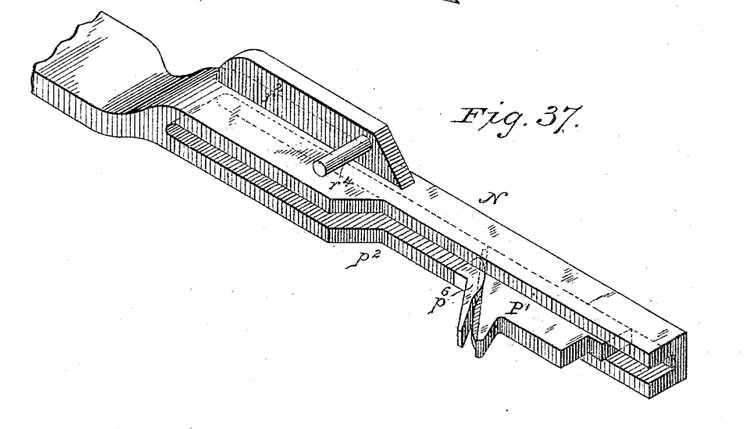

The slot P in the supporting-block, which admits the cord to the holder, passes nearly across the channel or way for the reception of the sliding bar and is enlarged therebeneath. A finger, $p$, Figs. 24 and 32, projects into this enlargement, so as to form a re-entering recess, $p'$, into which the ends of the cord may be pushed by a shoulder or shoulders, $p^2$, on said bar. To one side of the finger, which at its base is of full thickness and at this point forms the first or stationary jaw of the holder, the block is cut away to receive the yielding holding-jaw P', which has a longitudinally-ribbed diagonal edge trending to meet the sliding bar and fitting against a converse diagonal edge of the stationary jaw, and is pressed forward against the latter by a spring, $p^3$, attached to the side of the block, and limited in its movement against the stress of said spring by a pin or stop, $p^4$, from the block arranged behind a projecting finger, $p^5$, of the jaw. This spring-pressed jaw projects over the groove or way for the sliding bar and covers and closes the re-entrant notch or recess formed by the projecting part or finger of the stationary jaw. The latter, being integral with the metal of the supporting-block, cannot be readily given the requisite temper for its purpose. It is therefore faced by a removable piece or plate of hardened steel, $p^6$, having its edge grooved to receive the ribbed edge of the other jaw and cut away, as at $p^7$, for the escape of fag ends of cord.

The sliding bar is channeled laterally to receive and closely embrace so much of the springjaw and of the plate against which it works as projects over the channel or guideway. Therefore, whenever it is carried forward against the cord, its shoulders $p^5$—one on each side of the channel and abreast of each other—coming against the strands stretched through the slot, (the old strand bent up from the grip in the holder and the new strand from the spool,) will carry them against the oblique edge of the spring-pressed jaw until they force the latter slightly back, when they will slip in between it and the converse jaw, and, being supported by the shoulders of the sliding bar both above and beneath the yielding jaw, will move obliquely into the re-entrant recess until they are firmly held between the two jaws. Escape will then be barred to the spool-strand at first by the shoulders of the sliding bar, which remain pressed against it until the carriage starts upon its inward traverse, and, secondly, by the projecting finger $p$, beneath which it is bent or looped by the rise of the binder-arm.

Above the jaws and supported upon the lug forming the back to the stationary jaw is a knife, Q, which projects over the channel in the supporting-block at such height as to bring it immediately above and in close proximity to the upper surface of the sliding bar. The edge of this knife is set back somewhat from the edge of the yielding jaw, and it operates against the upper shoulder of the sliding bar to sever the strand immediately after it has been pushed into the grasp of the holding-jaws and in the same movement of the bar which pushes them into that grasp. This knife may be secured by a single screw, $q$, an appropriate seat being formed for it, and a ledge, $q'$, staying it against the pressure of the cord.

In most modern machines the old end of the cord is retained in the holder during the knotting action, while the second strand alongside thereof runs through the eye of the binding-arm to the spool. As the knotter revolves it demands slack from both these strands, and it is furnished in the first strand by causing the holder to yield, while the second strand takes it from the spool by pulling through the eye of the binder-arm. In the present machine, as in those above considered, the old end or outer strand of the band is to be retained in the holder until the knot is formed and the second strand is to be free to pull from the spool; but as a stationary holder is desirable, and as I consider some objections to exist to the employment of yielding holders, other means have been adopted herein for furnishing the slack from the old end.

Figure 19:
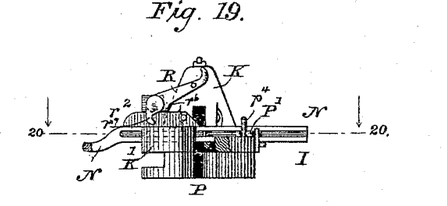
Fig. 19, the same, with the slack-give-up at the end of its movement in yielding the cord to the knotter.
Figure 20:
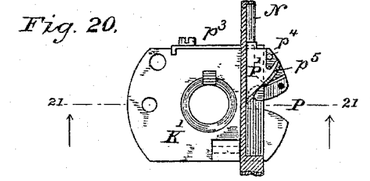
Figs. 20 and 21, details of the cord holder and cutter in plan and in section.
Figure 21:
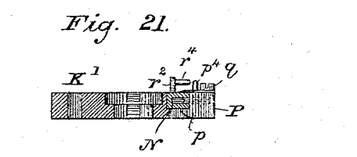
Figure 25:
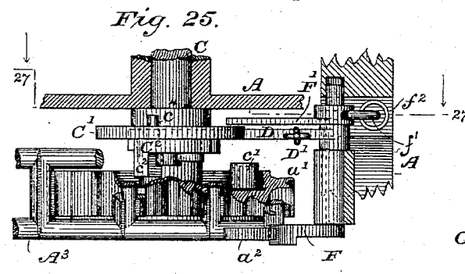
Fig. 25, a detail in enlarged plan of the clutching arrangement between the driving-shaft and the sprocket-wheel at the inner front corner of the binding-table, showing, also, a portion of the tripping devices.

Pivoted to an upright lug from the supporting-plate K' is a finger, R, of such length that when swung up to the top of the knotter its curved end $r$ will come immediately in front of the jaws thereof. Near to this end it has a lateral pin, $r'$, projecting out into the space in which the strands of the cord are laid. Upon the sliding bar is a vertical flange, $r^2$, having a beveled front end, $r^3$, and a lateral pin, $r^4$, also projecting out so as to cross the cord-receiving space as the bar is reciprocated back and forth. The pivoted finger and the vertical flange are in the same plane, so that the movement of the bar will carry the flange beneath the finger, the pivot of which is immediately above said flange, and the beveled front end of the flange, striking the flattened shank $r^6$ of the finger, will lift it into the position indicated in Fig. 19, when it will be locked by the plane upper surface of said flange with its lateral pin to one side of the line in which the cord is stretched by the binder-arm when it rises, while the sliding bar, passing on to force the end of the cord into the holder, will bring the pin $r^4$ which it carries upon the other side of that space. Immediately after this the binding-carriage is expected to reach the termination of its outward traverse and the binding-arm to rise, bringing up a new strand of cord and laying it between these pins. Now, whenever the carriage moves inward for the next binding operation the sliding bar will be retracted, bringing the pin which it carries against the strand of cord stretched from the holder to the point of the binding-arm, and will carry that strand back with it, pulling slack from the spool, while the pin on the pivoted finger will stop the passage of said strand and cause it to be bent or folded between the two pins. As more and more slack is drawn off and the sliding bar moves farther back, the inclined end of its lateral flange is withdrawn from beneath the finger, which is thus unlocked, and immediately thereafter the lateral pin $r^4$ from said flange strikes a heel-extension, $r^7$, from the finger and swings it down from its pivot, drawing still more slack from the spool. An entire bight of the cord has thus been laid horizontally from the holder to the pin on the sliding bar, then back to the pin on the end of the finger, and thence to the point of the binder-arm and to the spool. At this moment the knotting operation is to begin and the movement just described will be reversed. The sliding bar at the proper time after the knotter has commenced its revolution moves forward, and the slack contained in the bight is gradually delivered up, the curved point of the finger serving in this operation as a guide not only to lay this strand properly, but the other one pushed over it by the tucker, and finally, by rising to the proper level, to direct both strands between the open jaws. When the slack has been given up, the sliding bar comes temporarily to rest; but as soon as the ends of the band have been grasped by the knotting-jaws it moves forward abruptly to push the spool-strand into the holder and to sever both strands between the knotter and holder. During this last motion the slack-finger remains stationary, and it thereafter continues stationary to the termination of the outward traverse and until the sliding bar is again retracted upon the inward traverse.

With the mechanism as described the knotter is reversely rotated as the binding-carriage moves inward until it is brought into its initial position for the knot-forming action. As one strand of the cord is stretched up from the holder to the point of the elevated binder-arm during the whole of the inward traverse, there would naturally be danger of its being struck and displaced by the projecting knotting-jaws in such reverse movement. To prevent this, a gate is so arranged as to bar its approach within the range of movement of these jaws until the termination of the inward traverse, when the knotter has reached the end of its reverse rotation. A cap or shield, S, slotted conformably with the slot in the supporting-block and seat on the end of the binder-carriage, and with a central aperture, $s$, immediately above the crown of the knotter, to which said slot reaches, is arranged upon said supporting plate or block to cover and protect the knotter and the holder and cutter. At the rear inner corner of this cap is a cylindrical stud, $s'$, which receives the spindle of the curved cord-gate S'. From the foot of this spindle an arm, $s^2$, projects forward nearly parallel with the body of the gate, and has at its front or inner end a pendent pin, $s^3$, which comes upon the inner periphery of the segment-rim and travels thereon as a track. Just as the carriage is reaching the end of its inward traverse this pin rides up an incline, $s^4$, on said segment to a second track concentric with but on a smaller arc than the first, by which the gate is opened to admit the strand of the cord previously held in the holder and the second strand brought down by the binding-arm to complete the band about the gavel into the central aperture for the action of the knotter, the tucker at the same time pushing these strands before it into their proper position. The instant the carriage starts on its outward traverse the pin returns off of the incline, and the gate is closed by the force of a coiled spring about its pivot in the cylindrical stud, so that the strands already admitted and being united will be confined in said central aperture immediately above the crown of the knotter and prevented from escape, and, so also, that when the binder-arm rises at the completion of the binding operation and lays the new strand from the holder it will be shut out from said central aperture until the next inward traverse is being completed.

To facilitate the withdrawal of the knot after it has been tied, as well as to prevent abrasion of the cord during the knotting operation, a small sheave or anti-friction roll, $s^5$, is mounted in ears from the cap immediately behind the central aperture, against which sheave the two strands of the cord will be pressed in the outward traverse, and over which they, together with the knot, will be drawn when the latter has been fully tied and the ends severed. The case has also an opening, $s^6$, on its inner side, or that side nearest the transverse casting which operates the sliding bar for giving up slack and for carrying the cord into the holder and severing it against the cutter, the purpose of which opening is to admit the play of that pin carried by the bar over which the bight of the cord is looped in drawing slack from the spool.

Summarizing the operations of the machine, the grain delivered from the harvester and fed down the grain-chute, or from whatever delivery apparatus lies intermediate between the harvester and the binder, accumulates beneath the trip-lever until the latter is raised a sufficient height to start the clutch. The binder-carriage then moves inward. The sliding bar in the knotting-head, which has remained stationary from the moment the cord was severed in the last binding operation, is gradually retracted during such movement to pull slack from the spool and store it up in that portion of the cord between the holder and the point of the binder-arm, and as the carriage comes to a stop at the termination of its traverse the cord-gate is opened and the binder arm descends, carrying the second strand down around the gavel. The tucker, advancing, forces this strand past the gate and into the range of the knotter. The carriage then starts outward, the knotter immediately commences to revolve, and during practically the first half of its revolution the sliding bar advances toward it to yield up slack from the old strand of the cord and bring the guide-finger into its elevated position to direct both strands between the open jaws of the knotter, while the slack for the second strand is pulled through the eye of the needle by the action of the knotter itself. During the latter part of the revolution of the knotter no slack is needed, as it is essentially returning upon the cord, and therefore the sliding bar is for the time stationary. When, however, the ends of the cord have been directed between the open jaws of the knotter and said jaws have closed upon it and are withdrawn into the shell, the knotter at this moment having completed its revolution, the sliding bar is moved forward sharply a farther distance to push the spool-strand into the holder, by which it is grasped, and incidentally the old strand too, and to sever both old and new strands between the holder and the knotter, so that the sheaf may be ejected from the machine. The strand leading from the spool through the eye in the end of the binder-arm is now alone grasped in the holder, and, the carriage approaching the termination of its outward traverse, the arm rises, opening with it the compressor and causing the tucker to close into its position of rest and laying this new strand, which in its turn becomes the old, in the slot leading to the knotter and between the pins upon the guide-finger and the sliding bar, so that slack may be drawn therefrom in the next inward movement. With the parts in this position the carriage comes to rest and awaits the accumulation of the next gavel.

I claim—

1. The combination, substantially as hereinbefore set forth, of the trip-lever, its rock-shaft, the cam secured to the end of said rock-shaft and having two concentric tracks connected by an incline, the pivoted arm resting upon said cam-tracks, the link suspended from the end of said arm, and the trip-stop or shipper actuated by said link.

2. The combination, substantially as hereinbefore set forth, of the trip-lever, its rock-shaft, the block pinned to the end of said rock-shaft, the compensating cam sleeved loosely on the rock-shaft, and the clamping-nut taking from the end of the block into a curved slot in the cam, whereby said cam may be adjusted radially about the rock-shaft.

3. The combination, substantially as hereinbefore set forth, of the trip-lever, its rock-shaft, the compensating cam adjustable radially about the end of said shaft, the pivoted arm having a roller which follows the tracks of the cam, and the link connecting the end of said arm with the trip-stop or shipper.

4. The combination, substantially as hereinbefore set forth, of the grain-chute, its ledges, the feed-chain mounted between said ledges with its teeth projecting above their edge, and the sprocket-wheels at the head and foot of the ledges, whereby said chain is supported and driven.

5. The combination, substantially as hereinbefore set forth, of the ledges on the grain-chute for the passage of the binder-arm, outwardly curved at their feet, the trip-lever overhanging said ledges at their lower ends, and the toothed feed-chain mounted on sprocket-wheels at the head and foot of said chute between two of said ledges.

6. The combination, substantially as hereinbefore set forth, of the reciprocating binding-carriage, the chain by which it is driven, the inner sprocket-wheel which actuates said chain, the tripping-clutch between the sprocket-wheel and its driving-shaft, the trip arm or lever to throw said clutch into engagement whenever a gavel of proper size accumulates, and mechanism operated by a wiper or tappet upon the carriage-chain to throw said clutch out of engagement.

7. The combination, substantially as hereinbefore set forth, of the continuously-rotating shaft, the driving-dog pivoted midway of its length to a pin rigid with said shaft, the wheel and stop-pin with which said dog engages, and mechanism acting alternately on either end of the dog to rock it upon its pivot and throw it in and out of engagement.

8. The combination, substantially as hereinbefore set forth, of the disk upon the driving-shaft, the driving-dog pivoted to a pin from said disk, the sprocket-wheel and its stop, the pin from the dog projecting through a slot in the disk, and means whereby said dog may be caught or latched at each extreme of its movement along said slot.

9. The combination, substantially as hereinbefore set forth, of the disk fixed to the driving-shaft, the driving-dog pivoted to said disk, the sprocket-wheel and its stop, and the trip-stop or shipper arranged to be lifted into the path of the heel of said dog to tip it upon its pivot and bring it against the stop upon the sprocket-wheel to drive the latter.

10. The combination, substantially as hereinbefore set forth, of the disk fixed to the driving-shaft, the driving-dog pivoted to said disk and having a pin projecting through a slot in the disk, the sprocket-wheel and its stop against which said dog may be thrown, the trip-stop or shipper arranged to be lifted into the path of the heel of the dog to tip the latter upon its pivot and bring it against the stop, and the disengaging-stop adapted to be brought against the projecting pin to push the dog up along the slot and disengage it from the stop.

11. The combination, substantially as hereinbefore set forth, of the disk fixed to the driving-shaft, the driving-dog pivoted to said disk and having a pin projecting laterally through a slot in the disk, the sprocket-wheel and its stop, and the disengaging-stop adapted to be brought against the pin to push the dog up along the slot and disengage it from the stop.

12. The combination, substantially as hereinbefore set forth, of the disk fixed to the driving-shaft, the driving-dog mounted upon a pivot-pin fixed to said disk, the cam upon the end of said pivot-pin, the spring pressed block in the dog, and the roller carried by said block, pressing against the edge of the cam in order to latch the dog at the extremes of its vibration.

13. The combination, substantially as hereinbefore set forth, of the disk fixed to the driving-shaft, the driving-dog mounted upon a pivot-pin fixed to said disk, the heart-cam upon the end of said pin, the spring-pressed sliding block in the body of said dog, the roller carried by said block and pressing against the edge of the cam, the sprocket-wheel and its stop, the pin projecting from the dog through a slot in the disk, the trip stop or shipper, and the disengaging-stop.

14. The combination, substantially as hereinbefore set forth, of the slotted disk fixed to the driving-shaft, the driving-dog pivoted to said disk, the sprocket-wheel and its stop, the trip-stop or shipper acting against the heel of said dog, the trip lever operating said shipper, and the disengaging-stop to return the dog into position at the end of the binding operation to throw the dog away from the stop or driving-pin.

15. The combination, substantially as hereinbefore set forth, of the driving-dog pivoted to the fixed disk, the sprocket-wheel and its driving-pin, the chain driving the reciprocating binding-carriage, the tappet on said chain, the pawl lifted by said tappet, and the disengaging-stop brought into effective position by said pawl.

16. The combination, substantially as hereinbefore set forth, of the pawl, the tappet by which it is lifted, the shaft or spindle which it rocks, and the disengaging-stop pivoted to said shaft or spindle in such manner as to be permitted a further motion irrespective of the pawl after it has been lifted into position for action by the latter.

17. The combination, substantially as hereinbefore set forth, of the reciprocating binding-carriage, the chain by which it is moved back and forth, a lug or shoulder on said chain, and a pawl upon the fixed frame-work adapted to drop behind said shoulder and prevent retrograde movement of chain and carriage.

18. The combination, substantially as hereinbefore set forth, of the carriage-chain, the tappet fixed upon said chain, the clutch between the sprocket-wheel and the driving-shaft, the disengaging-stop, the pawl by which said stop is brought into position when lifted by the tappet, and the shoulder behind said tappet into which the pawl drops to prevent retrograde motion of the carriage.

19. The combination, substantially as hereinbefore set forth, of the binder-arm, the cord-tucker pivoted thereto, and the stop-motion by which said tucker is operated in the sweep of the arm.

20. The combination, substantially as hereinbefore set forth, of the binder-arm, the tucker pivoted thereto, the disk fixed to the supporting-bracket and provided with two curved tracks, with an intermediate tooth, and the curved shoes upon the heel of the cord-tucker, with intermediate recess to receive said tooth, whereby the tucker is locked in between the sides of the binding-arm during a portion of the movement of the latter, and then advanced quickly and locked at a fixed distance in front thereof during the remainder of its movement.

21. The combination, substantially as hereinbefore set forth, to form a knotting device, of a cam-surfaced conoidal shell serving to guide and deflect the cord as it revolves, jaws pivoted within such shell and adapted to be projected through an aperture in its crown to form a practical continuation thereof, and means whereby said jaws may be retracted within the shell after they have seized the ends of the cord.

22. The combination, substantially as hereinbefore set forth, to form a cord-knotter, of a cam-surfaced conoidal shell, a jaw pivoted within such shell, so as to be projected and retracted through an aperture in the crown thereof, and a second jaw connected to the shank of the first, so as to slide relatively thereto, and forming the upper jaw, a link connected to the shank of said second jaw, and means whereby the link may be reciprocated to project the jaws and open the upper away from the lower, and to close and retract them.

23. The combination, substantially as hereinbefore set forth, in a cord-knotter, of two jaws opening away one from the other, a stop or shoulder upon the crown of the outer jaw, exposed when said jaw is open to check the cord loop from slipping off, and raised sides to the inner, between which said shoulder sinks as the jaws close to permit the escape of the loop.

24. The combination, substantially as hereinbefore set forth, of the two jaws connected in such manner that one may slide relatively to the other to open and close them, the shoulder upon the crown of the upper jaw to prevent the loop from slipping off while the two are open, and the raised sides to the lower jaw, beneath which said shoulder sinks when the two are closed.

25. The combination, substantially as hereinbefore set forth, of the cam-surfaced conoidal shell, the lower jaw pivoted therein, the upper jaw connected to said lower jaw in such manner that its shank slides along the shank of the other, the shoulder on the crown of the upper jaw, and the raised sides to the lower jaw, between which said shoulder sinks as the jaws are closed.

26. The combination, substantially as hereinbefore set forth, of the cam-surfaced conoidal shell, the lower jaw pivoted therein, the upper jaw connected to the first, so as to slide relatively thereto, the link attached to the shank of the upper jaw to project it and the other through the opening in the crown of the shell and open said upper jaw away from the lower jaw and to close and retract them, and the stop against which the shank of the upper jaw comes as the two are retracted to open said jaws for the release of the knot.

27. The combination, substantially as hereinbefore set forth, of the cam-surfaced conoidal shell, the jaws pivoted therein, the pinion fixed to the tubular shank of said shell, the link depending through said shank and operated to project and retract said jaws at the proper moment, and the rack by which the shell and jaws are rotated.

28. The combination, substantially as hereinbefore set forth, to form a slack-give-up for the knotter, of the channeled supporting-block, the bar sliding therein, the flange upon said bar, the pin projecting laterally from said flange, the finger pivoted above the flange and having a shoe whereby it is lifted as the flange passes beneath, and also a lateral pin corresponding to the pin upon the flange.

29. The combination, substantially as hereinbefore set forth, of the cord-holder, the binding-arm, the revolving knotter or tying-bill, the vibrating finger serving to lift and guide the cord ends as the knotter revolves and direct them into its open jaws, and a slack-give-up between said knotter and binding-arm operating to store up a slack length of the spool-cord and yield it as the knotter demands.

30. The combination, substantially as hereinbefore set forth, of the revolving tying-bill, the sliding bar, its flange and lateral pin, the guide-finger pivoted above said flange and raised and locked thereby, the lateral pin from said finger, and the heel projection of said finger, whereby a slack length is formed in the cord and afterward yielded up to the knotter and the two strands of cord guided between the jaws of the knotter.

31. The combination, substantially as hereinbefore set forth, of the channeled block slotted to admit the cord, the stationary holding-jaw supported on one side of the slot, the spring-pressed holding-jaw acting against said stationary jaw and projecting over the channel, and the laterally-grooved sliding bar embracing said spring-pressed jaw and having shoulders which come on each side thereof to force the cord between it and the stationary jaw.

32. The combination, substantially as hereinbefore set forth, of the channeled block slotted to admit the cord and having a re-entrant notch or recess, as described, the stationary jaw on one side of said slot, the spring-pressed jaw acting against said stationary jaw and beveled or slanting toward the slot, projecting over and covering the re-entrant notch and partly over the channel in the block, and the laterally-grooved sliding bar embracing said projecting portion of the spring-pressed jaw and having shoulders which force the cord on each side thereof and between it and the stationary jaw.

33. The combination, substantially as hereinbefore set forth, with the beveled spring-pressed jaw and the laterally-grooved sliding bar embracing said jaw and having shoulders to force the cord against it, of the stationary jaw cut away beyond the clamping-point to permit the escape of fag ends.

34. The combination, substantially as hereinbefore set forth, of the beveled spring-pressed jaw, the channeled supporting-block, the stationary jaw or lug rising therefrom, and the face-plate, of hardened metal, laid against said jaw or lug, grooved to receive the ribbed edge of the movable jaw.

35. The combination, substantially as hereinbefore set forth, of the channeled block slotted to admit the cord, the stationary holding-jaw on one side of said slot, the spring-pressed jaw acting there against, the laterally-grooved sliding bar and its shoulders, and the knife overlying said sliding bar and acting against its upper shoulder to sever the cord between the holder and the knotter.

36. The combination, substantially as hereinbefore set forth, of the cord-holder, a slack-storing device intermediate between it and the knotter, and a sliding bar so controlled as to advance a suitable distance during the movement of the knotter to yield up slack from the storing device and then make another and distinct advance to carry the cord ends into the holder.

37. The combination, substantially as hereinbefore set forth, of the knotter, the cap covering and protecting it, the cylindrical lug on said cap, the cord-gate fixed to a pivot or spindle within said lug and projecting across the cord-slot, the spring within the lug, whereby the gate is held closed, and the arm and pin acted upon by the incline upon the segment-rack which drives the knotter to open the gate to admit the cord as the binder-arm descends.

38. The combination, substantially as hereinbefore set forth, with the knotter, of the segment-rack pivoted to the reciprocating binding-carriage, the eccentric pin on said segment, and the cam-track in the transverse casting, into which said pin takes, whereby the rack is operated during a portion of the traverse and held fixed during another portion.

39. The combination, substantially as hereinbefore set forth, of the knotter, its retracting jaws, the link connected to said jaws, the elbow-lever to which said link is collared, the pin or anti-friction roll at the other end of said lever, and the cam-track in the transverse casting, having straight sections and an intermediate incline, whereby the link and jaws are held projected during a portion of the traverse, are quickly retracted during a succeeding portion, and are held in said retracted position during the remaining portion.

40. The combination, substantially as hereinbefore set forth, of the sliding bar in the knotting-head, the swinging arm to which it is connected, the pin on said arm, and the cam-track which said pin follows, having two inclined portions and intermediate and terminating straight portions, whereby said bar is stationary at the commencement of the outward traverse, is then moved to give up slack, and again held stationary, next moved to push the cord into the holder and to sever it, and finally again held stationary during the remainder of the outward traverse.

41. The combination, substantially as hereinbefore set forth, with the knotter, of the segment-rack, the cam-track by which it is actuated, the elbow-lever, and the cam-track by which said lever is operated, said tracks being shaped and relatively arranged as described.

42. The combination, substantially as hereinbefore set forth, of the reciprocating binding-carriage, the knotter, the segment-rack by which it is operated, the retracting jaws and the elbow-lever operating them, the cord holder and cutter, the sliding bar and the arm to which it is connected, the transverse casting, and the three cam-tracks in said casting operating said rack, elbow-lever, and arm in the manner described.

CHAS. B. WITHINGTON.

Witnesses:
W. J. DUNN,
JOHN V. A. HASBROOK.